(12) United States Patent
Busche (10) Patent No.: US 10,899,478 B2
(45) Date of Patent: *Jan. 26, 2021

(54) STACKABLE PANCAKE SATELLITE

(71) Applicant: The Boeing Company, Chicago, IL (US)

(72) Inventor: Gregory Clayton Busche, Rolling Hills, CA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/693,765

(22) Filed: Nov. 25, 2019

(65) Prior Publication Data
US 2020/0102099 A1    Apr. 2, 2020

Related U.S. Application Data

(63) Continuation of application No. 15/366,698, filed on Dec. 1, 2016, now Pat. No. 10,532,830.
(Continued)

(51) Int. Cl.
*B64G 1/10* (2006.01)
*B64G 1/22* (2006.01)
(Continued)

(52) U.S. Cl.
CPC ............ *B64G 1/1085* (2013.01); *B64G 1/10* (2013.01); *B64G 1/22* (2013.01); *B64G 1/283* (2013.01);
(Continued)

(58) Field of Classification Search
CPC ... B64G 1/10; B64G 1/40; B64G 1/44; B64G 1/22; B64G 1/1085; B64G 1/283; B64G 2700/66
See application file for complete search history.

(56) References Cited

U.S. PATENT DOCUMENTS

| 4,811,034 A | 3/1989 | Kaminskas |
| 4,854,526 A | 8/1989 | Rochefort |

(Continued)

OTHER PUBLICATIONS

Canadian Office Action dated Feb. 17, 2020 for Canadian Patent Application No. 2,964,003.
(Continued)

*Primary Examiner* — Richard R. Green
*Assistant Examiner* — Michael A. Fabula
(74) *Attorney, Agent, or Firm* — Gates & Cooper LLP (57) ABSTRACT

A stackable pancake satellite that is configured so that a plurality of the satellites can be stacked within a payload fairing of a launch vehicle. Each satellite includes sections that are folded or rotated together prior to launch, and unfolded or rotated away from each other when deployed. A first section is a satellite body having a first side that acts as a thermal radiator and a second side opposite the first side that includes an antenna. A second section includes one or more solar panels attached adjacent to the first side of the satellite body. A third section includes a splash plate reflector attached adjacent to the second side of the satellite body that reflects signals between Earth and the antenna. When deployed, the solar panels are pointed towards the Sun and the splash plate reflector directs the signals between the Earth and the antenna.

25 Claims, 11 Drawing Sheets

Related U.S. Application Data (60) Provisional application No. 62/347,751, filed on Jun. 9, 2016.

(51) Int. Cl.
    *B64G 1/28*     (2006.01)
    *B64G 1/40*     (2006.01)
    *B64G 1/44*     (2006.01)

(52) U.S. Cl.
    CPC ............... *B64G 1/40* (2013.01); *B64G 1/44* (2013.01); *B64G 2700/66* (2013.01)

(56) References Cited

U.S. PATENT DOCUMENTS

| | | |
|---|---|---|
| 5,052,640 A | 10/1991 | Chang |
| 5,199,672 A | 4/1993 | King et al. |
| 5,522,569 A | 6/1996 | Steffy et al. |
| 5,527,001 A | 6/1996 | Stuart |
| 5,641,135 A | 6/1997 | Stuart et al. |
| 5,642,122 A | 6/1997 | Lockie et al. |
| 6,536,712 B1 | 3/2003 | Barenett |
| 6,543,724 B1 | 4/2003 | Barnett |
| 6,568,638 B1 | 5/2003 | Capots |
| 7,478,782 B2 | 1/2009 | Huang et al. |
| 9,718,566 B2 | 8/2017 | Field et al. |
| 10,532,830 B2 * | 1/2020 | Busche .................. B64G 1/283 |
| 2001/0045494 A1 | 11/2001 | Higgins |
| 2018/0257795 A1 | 9/2018 | Ellinghaus |

OTHER PUBLICATIONS

Extended European Search Report dated Oct. 22, 2019 for European Patent Application No. 19176307.7.
Extended European Search Report dated Nov. 2, 2017 for European Patent Application No. 17171562.6.
European Examination Report dated Nov. 17, 2020 for European Patent Application No. 19176307.7.

* cited by examiner

STACKABLE PANCAKE SATELLITE

CROSS REFERENCE TO RELATED APPLICATIONS

This application is a continuation under 35 U.S.C. Section 120 of the following co-pending and commonly-assigned application:

U.S. Utility application Ser. No. 15/366,698, filed on Dec. 1, 2016, naming inventor Gregory Clayton Busche, entitled "STACKABLE PANCAKE SATELLITE,", now U.S. Pat. No. 10,532,830, issued Jan. 14, 2020;

which application claims the benefit under 35 U.S.C Section 119(e) of the following co-pending and commonly-assigned application:

U.S. Provisional Application Ser. No. 62/347,751, filed on Jun. 9, 2016, naming inventor Gregory Clayton Busche, entitled "STACKABLE PANCAKE SATELLITE";

both of which applications are incorporated by reference in their entirety herein.

BACKGROUND INFORMATION

1. Field

The present invention relates to satellites, and in particular, to a stackable pancake satellite.

2. Description of the Related Art

Satellites and other spacecraft are used for a number of different purposes, including communication, navigation, observation and research. However, launching satellites into space is expensive.

There are many factors that contribute to the high cost of launching satellites. Moreover, these factors constrain satellite design decisions. Two of the most fundamental constraints on satellite design decisions are the number of satellites supported by a launch vehicle, and the geometry of a payload fairing for the launch vehicle, which sets limits on the geometry of the satellites.

Consequently, it is desirable if the satellite design supports storing more than one satellite on the launch vehicle. It is also desirable to have a satellite design that optimizes the geometry of the satellites for use within the geometry of the payload fairing.

What is needed, then, are improved designs for satellites. The present invention satisfies this need.

SUMMARY

To overcome the limitations in the prior art described above, and to overcome other limitations that will become apparent upon reading and understanding the present specification, the present invention discloses a stacked satellite system, a method for launching the stacked satellite system, and a method for fabricating a satellite for use in the stacked satellite system.

The stacked satellite system comprises a plurality of satellites configured for being stacked within a payload fairing of a launch vehicle. The satellites are disposed within the payload fairing of the launch vehicle in a stacked column configuration prior to launch. The plurality of satellites comprises at least one top satellite disposed vertically on top of at least one bottom satellite within the payload fairing of the launch vehicle, wherein a structure bears launch loads for both the top and bottom satellites. The satellites are passively dispensed from the payload fairing of the launch vehicle upon reaching orbit.

Each of the satellites includes a plurality of sections that are hingedly attached to each other, wherein the sections are folded or rotated together prior to launch, and unfolded or rotated away from each other when deployed upon reaching orbit. A periphery outline of the sections when folded together is oval, elliptical, round or polygonal in shape. The sections, when folded together, maintain a substantially flat profile.

A first one of the sections is a satellite body having a first side that acts as a thermal radiator and a second side opposite the first side that includes at least one antenna, which in one embodiment comprises a multi-beam antenna. The first one of the sections also includes bus and payload units mounted on or with the thermal radiator.

A second one of the sections includes at least one solar panel, and possibly two or more solar panels, attached adjacent to the first side of the satellite body, wherein light from the Sun is converted to electricity by the solar panel. In one embodiment, the solar panel comprises a multi-segmented array that is configured to be at least partially folded onto itself.

A third one of the sections includes at least one splash plate reflector attached adjacent to the second side of the satellite body, wherein radio frequency signals between Earth and the antenna of the satellite are reflected by the splash plate reflector.

The satellite body has a cavity on the first side and a hollow region on the second side, such that, when folded together, the solar panels are folded and stowed within the hollow region, the antenna is disposed within the cavity, and the splash plate reflector is stored adjacent to the antenna in the cavity.

In one embodiment, the thermal radiator and the solar panel are disposed within the hollow region, and the solar panel comprises a plurality of foldable solar arrays that, when folded, are enclosed within the hollow region. In another embodiment, the solar panel includes a plurality of panel elements having substantially the same shape, and the plurality of panel elements are each folded upon each other to fit within the hollow region.

When deployed, the solar panel is rotated away from the first side of the satellite body, so that the solar panel is pointed towards the Sun, and the splash plate reflector is rotated away from the second side of the satellite body to direct the signals between the Earth and the antenna. One or more mechanisms are employed to keep the solar panel pointed at the Sun, the splash plate reflector pointed at the Earth, and the thermal radiator pointed into space.

The method for launching a stacked satellite system comprises stacking a plurality of satellites within a payload fairing of a launch vehicle, wherein each of the satellites is configured as described above, launching the plurality of satellites into orbit using the launch vehicle, and serially dispensing each of the plurality of satellites from the payload fairing of the launch vehicle upon reaching orbit. In one embodiment, the satellites are passively dispensed from the payload fairing of the launch vehicle upon reaching orbit.

Orbit phasing is maintained with at least one thruster located on the satellite body by rotating the satellite body so that a desired thrust angle for the thruster is achieved, firing the thruster, and then restoring the satellite body to its original position after firing the thruster.

DRAWINGS

Referring now to the drawings in which like terminology and reference numbers represent corresponding parts throughout.

DETAILED DESCRIPTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

A stackable pancake satellite is comprised of a plurality of sections that are folded or rotated together into a flat configuration for launch, and are unfolded or rotated away from each other when deployed in orbit. The sections include a satellite body with a thermal radiator and an antenna, a solar cell panel, and a splash plate reflector for signals transmitted and received by the antenna. When folded into the flat configuration, a plurality of the satellites are stacked within a payload fairing of a launch vehicle.

Technical Details

Figure 1:
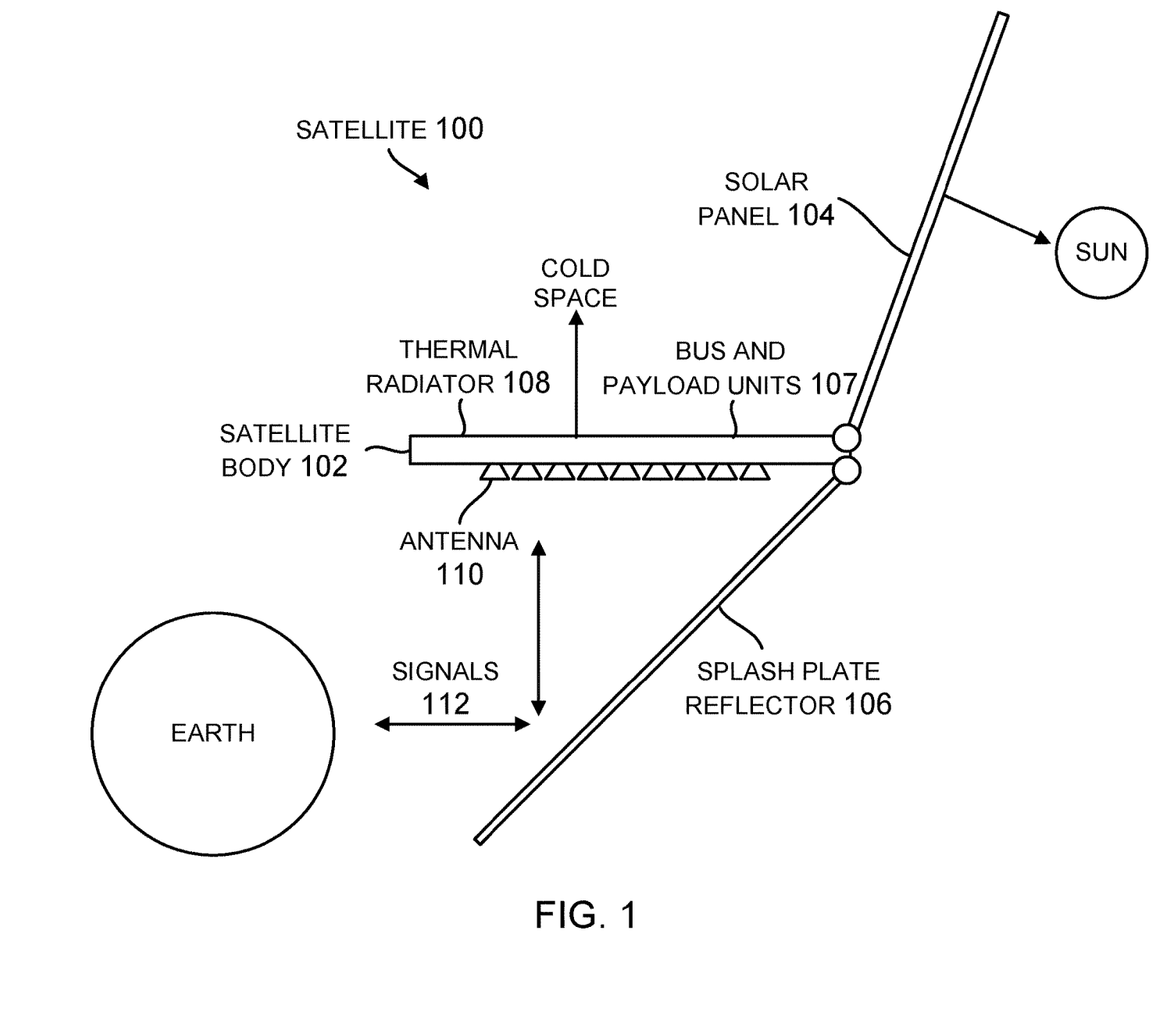
FIG. 1 is a side view of a stackable pancake satellite configured for being stacked within a payload fairing of a launch vehicle, according to one embodiment.

FIG. 1 is a side view of a stackable pancake satellite 100 configured for being stacked within a payload fairing of a launch vehicle, according to one embodiment. In this embodiment, the satellite 100 is a platform that includes a plurality of substantially flat sections, segments or panels 102, 104, 106 that are hingedly attached to each other, wherein the sections 102, 104, 106 are folded or rotated together for launch, and unfolded or rotated away from each other when deployed upon reaching orbit. In this embodiment, the satellite 100 is a three-panel spacecraft.

A first one of the sections 102 of the satellite 100 is a satellite body 102 having a first (top) flat side that acts as a thermal radiator 108 and a second (bottom) side opposite the first side that includes at least one antenna 110. The first section 102 may also include bus and payload units 107 mounted on or with the thermal radiator 108. The antenna 110 may comprise a multi-beam 110 or phased array antenna 110 with multiple antenna elements 110 (as shown) that include service and feeder-link arrays (not shown).

A second one of the sections 104 of the satellite 100 includes at least one solar panel 104 attached adjacent to the first side of the satellite body 102 with a sun-active surface of the solar panel 104 pointing away from the satellite body 102 and towards the Sun, wherein light from the Sun is converted to electricity by one or more solar cells of the solar panel 104.

A third one of the sections 106 of the satellite 100 includes at least one splash plate reflector 106 attached adjacent to the second side of the satellite body 102, wherein radio frequency (RF) signals 112 between Earth and the antenna 110 are reflected by the splash plate reflector 106.

When deployed, the solar panel 104 is rotated away from the first (top) side of the satellite body 102, so that the solar panel 104 is pointed towards the Sun, and the splash plate reflector 106 is rotated away from the second (bottom) side of the satellite body 102 to direct the signals 112 between the Earth and the antenna 110.

The terms top/bottom, up/down, and left/right used herein are relative terms that describe the relative position of the described elements. It is understood the satellite 100 may be at any orientation in space relative to an observer so that these terms may assume correspondingly different values.

One or more mechanisms may be employed to keep the solar panel 104 pointed at the Sun, the splash plate reflector 106 pointed at Earth, and the thermal radiator 108 pointed into cold space. Preferably, all of this occurs while the satellite 100 follows a circular track on orbit to keep the signals 112 pointed at the Earth.

Figure 2A:
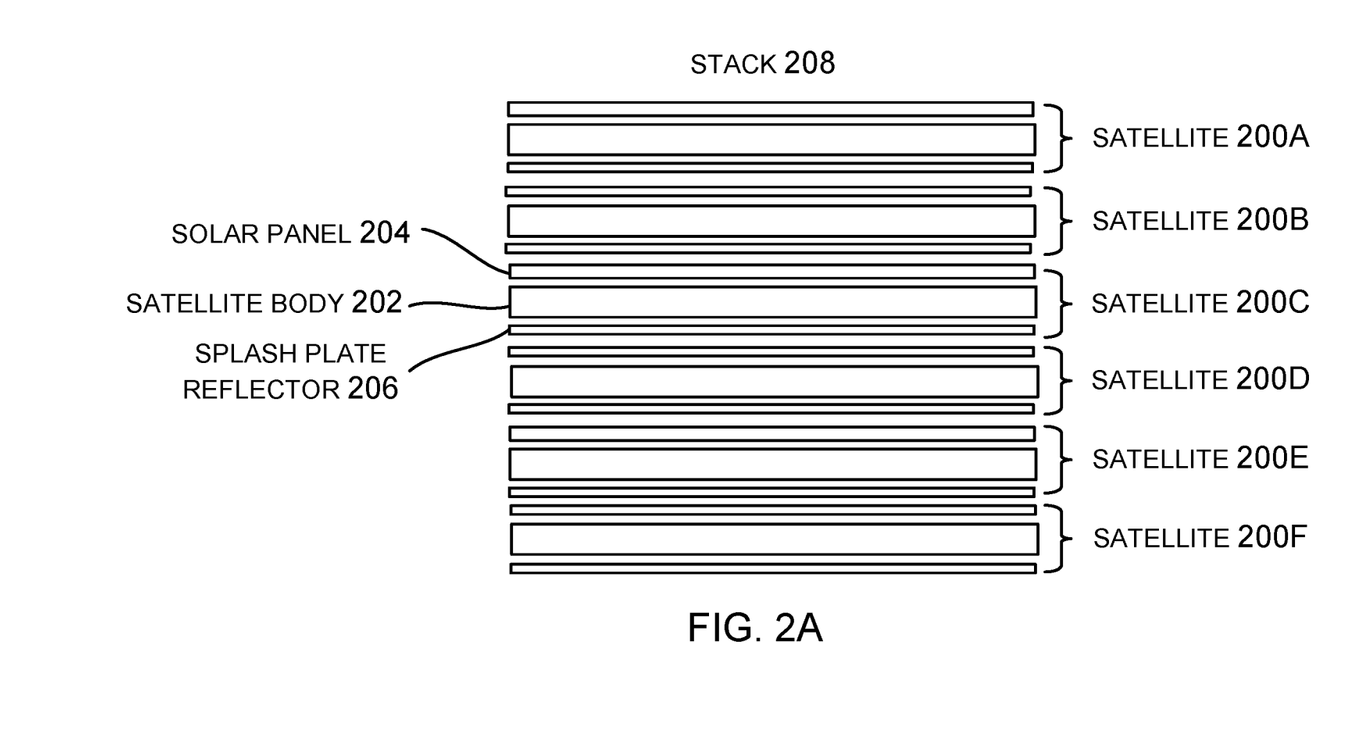
FIG. 2A is a side view of a plurality of satellites, according to one embodiment.

FIG. 2A is a side view of a plurality of satellites 200A, 200B, 200C, 200D, 200E, and 200F, each of which includes a satellite body 202, at least one solar panel 204 and at least one splash plate reflector 206. The plurality of satellites 200A, 200B, 200C, 200D, 200E, and 200F are folded and arranged in a stack 208, so that they can be stowed for launch within a payload fairing of a launch vehicle (not shown). Although FIG. 2A shows six satellites 200A, 200B, 200C, 200D, 200E, and 200F arranged in the stack 208, this not intended to be limiting and any number of satellites 200 may be so arranged.

Figure 2B:
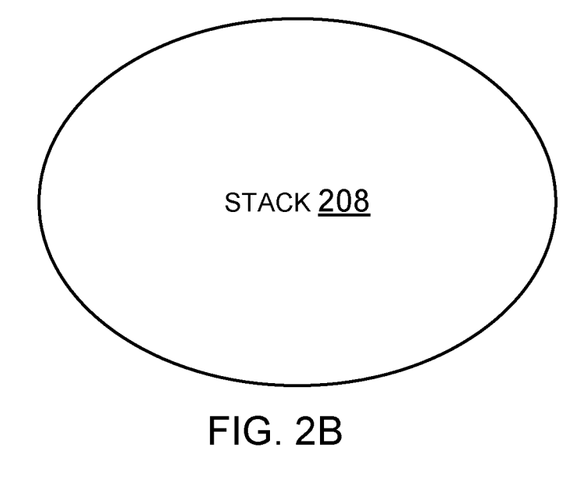
FIG. 2B is a top view of a stack of satellites, according to one embodiment.

FIG. 2B is a top view of the stack 208, illustrating that a periphery outline of the sections of the satellites 200A, 200B, 200C, 200D, 200E, and 200F when folded together is substantially oval or elliptical in shape.

Figure 3:
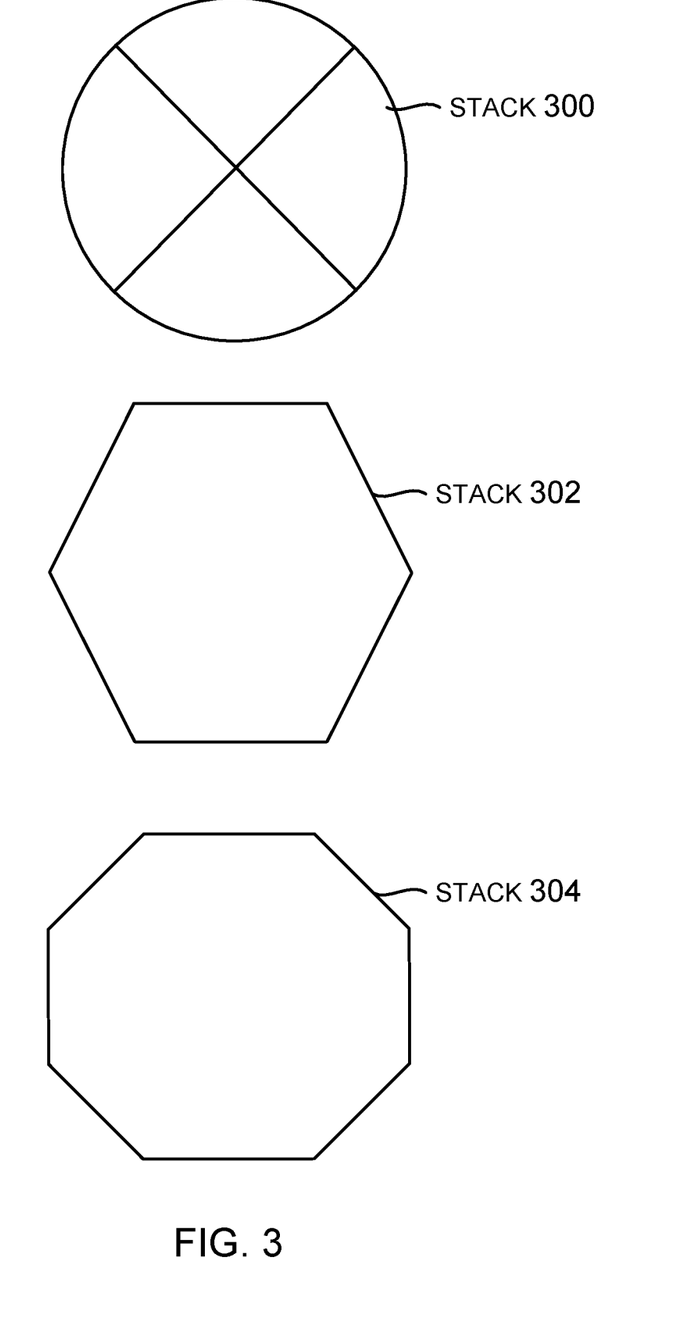
FIG. 3 illustrates three top views of stacks of satellites, illustrating different possible cross-sections.

FIG. 3 illustrates three top views of stacks 300, 302, and 304 of satellites, illustrating different possible cross-sections for the satellites, including substantially round 300, hexagonal 302, and octagonal 304 cross-sections. In various embodiments, a periphery outline of the sections of each satellite, when folded together and stacked, is round 300 or polygonal (e.g. hexagonal 302, octagonal 304, etc.) in shape. Other cross-sections may be used as well.

Figure 4A:
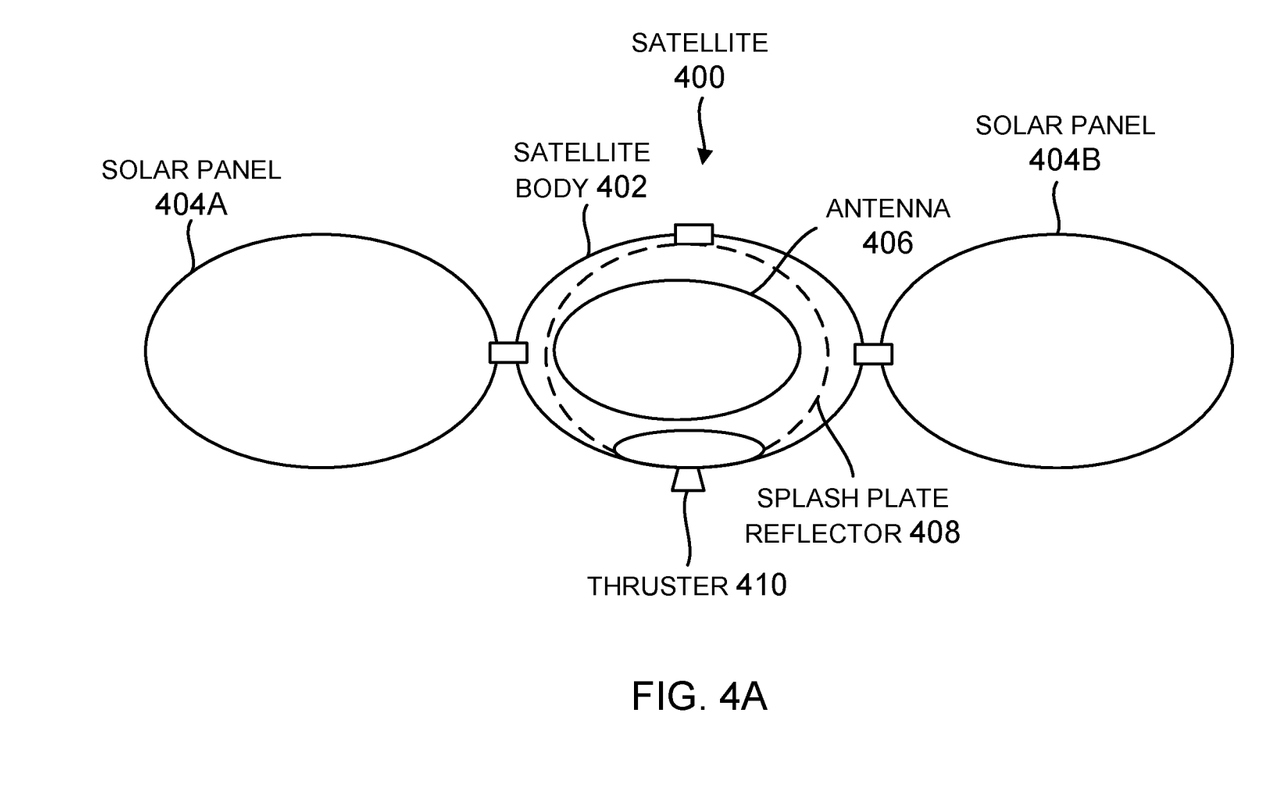
FIG. 4A illustrates another example of a stackable pancake satellite, according to one embodiment.

FIG. 4A illustrates another example of a stackable pancake satellite 400, according to one embodiment. In this embodiment, the satellite 400 includes a satellite body 402, two or more solar panels 404A, 404B, an antenna 406 comprising a C and Ka band array, and a splash plate reflector 408. The satellite body 402 has a cavity on the first side and a hollow region on the second side, such that, when folded together, the second one of the sections, comprising the two solar panels 404A, 404B, is folded and stowed within the hollow region. A thermal radiator (not shown) is also disposed within the hollow region. On an opposite side of the satellite body 402, the antenna 406 is stored within the cavity of the satellite body 402. The third one of the sections, comprising the splash plate reflector 408, is stored adjacent to the antenna 406 in the cavity.

In one embodiment, each of the solar panels 404A, 404B includes a plurality of panel elements having substantially the same shape, and the plurality of panel elements are each folded upon each other to fit within the hollow region. In another embodiment, each of the solar panels 404a, 404b comprises a multi-segmented array that is configured to be at least partially folded onto itself, prior to being stowed within the hollow region.

Also shown is a thruster 410 attached to an exterior panel of the satellite body 402. In one embodiment, the satellite 400 may use "all electric propulsion" with one thruster 410 or any number of independent thrusters 410.

Figure 4B:
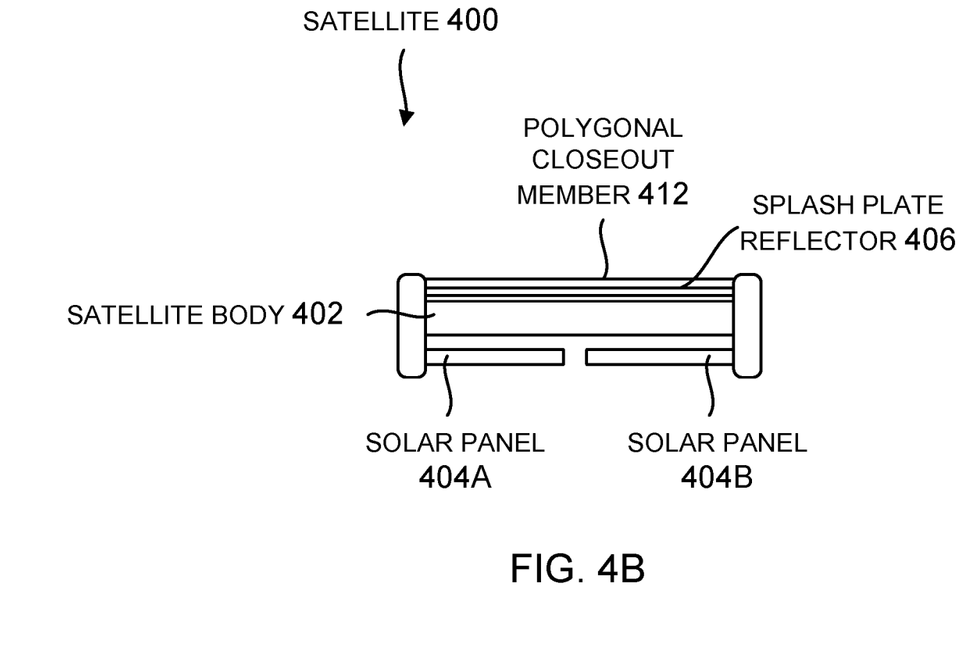
FIG. 4B illustrates a side view of the satellite of FIG. 4A, according to one embodiment.

FIG. 4B illustrates a side view of the satellite 400 of FIG. 4A, according to one embodiment. The relative positions of the satellite body 402, two solar panels 404a, 404b, and splash plate reflector 406, are shown when folded. A polygonal closeout member 412 covers the first side of the satellite body 402 surrounding the cavity.

Figure 4C:
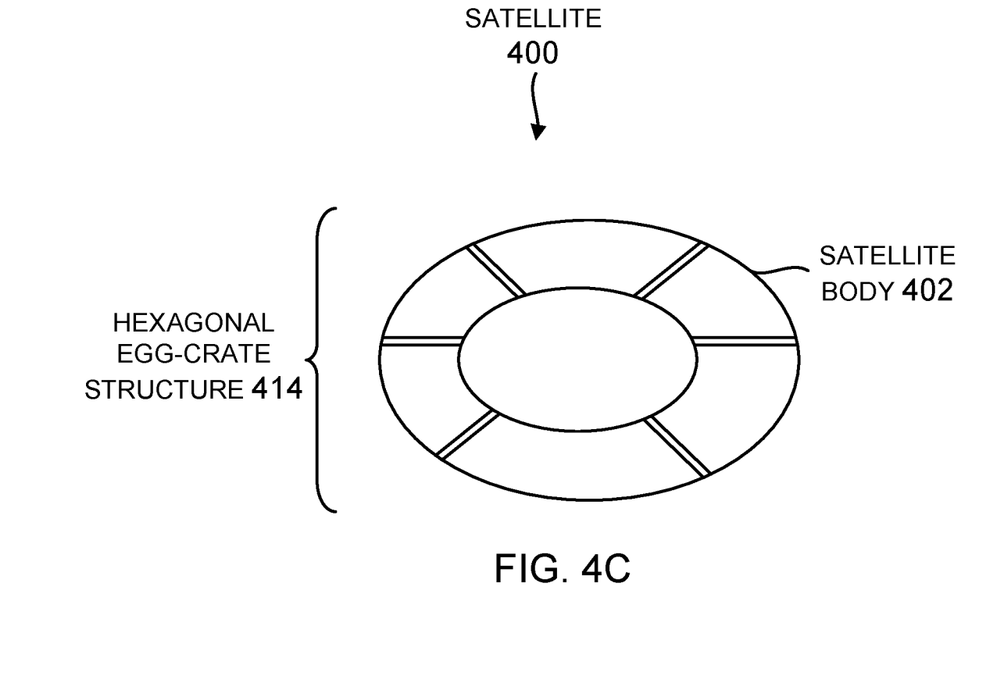
FIG. 4C illustrates a top view of the satellite of FIG. 4A, according to one embodiment.

FIG. 4C illustrates a top view of the satellite 400 of FIG. 4A, according to one embodiment. The top view shows the hexagonal egg-crate structure 414 of the satellite body 402.

Figure 4D:
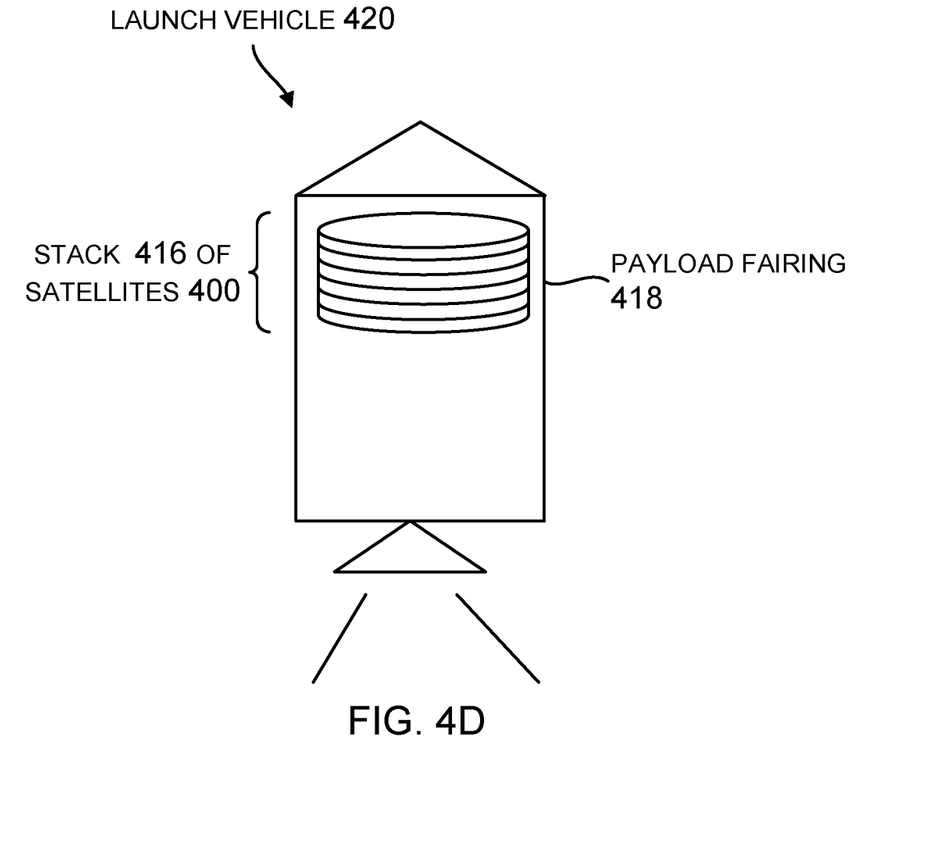
FIG. 4D shows a plurality of satellites in a stacked column configuration disposed within a payload fairing of a launch vehicle, according to one embodiment.

FIG. 4D shows a plurality of satellites 400 in a stacked column configuration 416 disposed within a payload fairing 418 of a launch vehicle 420 prior to launch, according to one embodiment. The plurality of satellites 400 comprises at least one top satellite 400 disposed vertically on top of at least one bottom satellite 400 within the payload fairing 418 of the launch vehicle 420, wherein a structure bears launch loads for both the top and bottom satellites 400. Upon reaching orbit, each of the satellites 400 in the stack 416 is passively and serially dispensed from the payload fairing 418 of the launch vehicle 420 without the use of a dedicated dispensing apparatus, although active dispensing may also be used.

Figure 5:
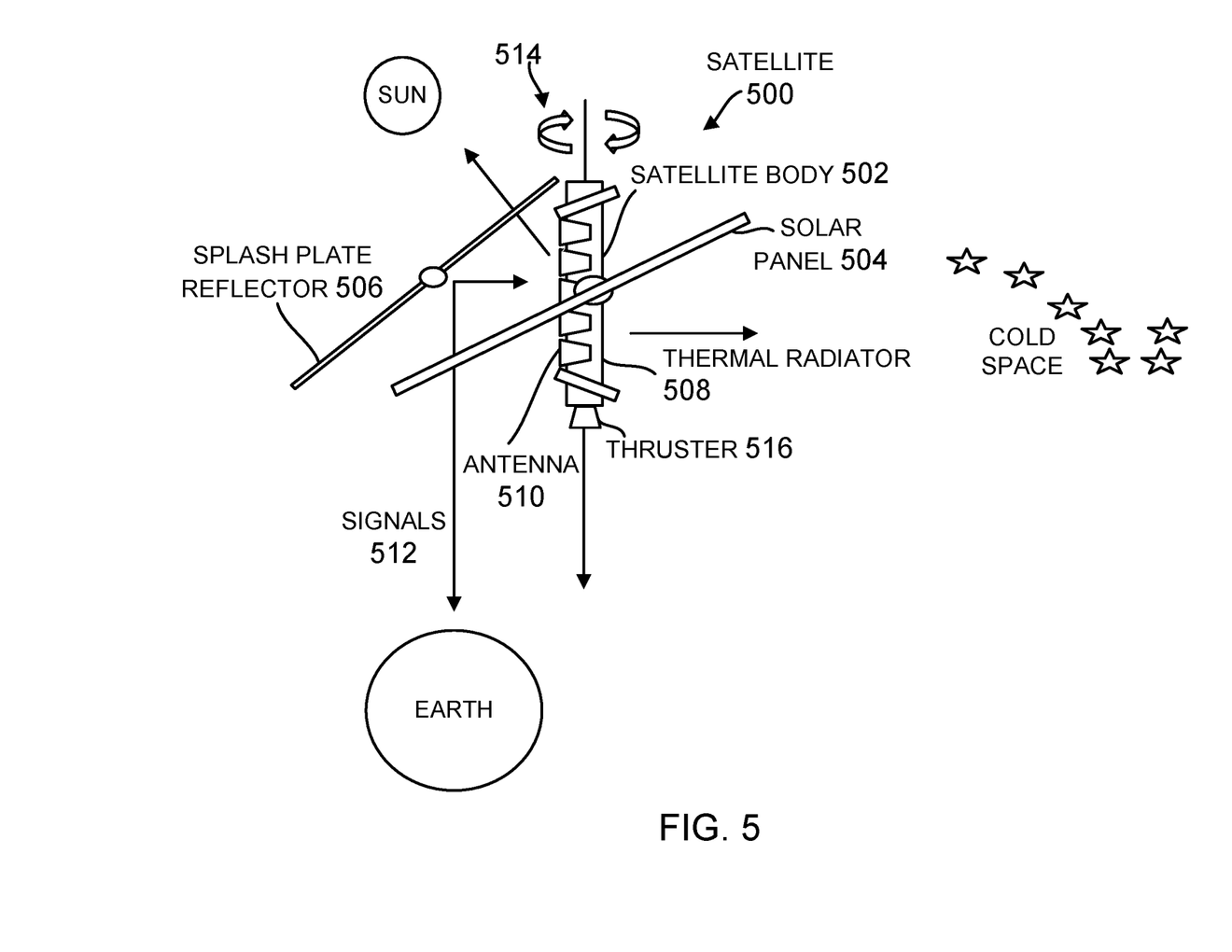
FIG. 5 illustrates a deployed satellite on orbit, according to one embodiment.

FIG. 5 illustrates a deployed satellite 500 on orbit, according to one embodiment. In this embodiment, the satellite 500 is comprised of a satellite body 502, solar panel 504 and splash plate reflector 506, wherein the solar panel 504 and splash plate reflector 506 are attached at different points on the satellite body 502. The satellite body 502 has a first (right) side that acts as a thermal radiator 508 and a second (left) side opposite the first side that includes an integrated antenna 510.

Both the solar panel 504 and splash plate reflector 506 are shown deployed. When deployed, the solar panel 504 is rotated away from the satellite body 502, so that the solar panel 504 is pointed towards the Sun. Similarly, when deployed, the splash plate reflector 506 is rotated away from the satellite body 502 to direct the signals 512 between the Earth and the antenna 510.

The arrows 514 at the top of the satellite body 502 indicate a yaw orientation about a center (nadir) axis of the satellite body 502 to keep the solar panel 504 pointed at the Sun (i.e., normal to the Sun on both axes), the splash plate reflector 506 pointed at Earth, and the thermal radiator 508 pointed away from the Sun into cold space.

In addition, at least one thruster 516 is attached to one end of the satellite body 502, or another suitable location on the satellite body 502, to maintain orbit phasing. In one embodiment, the thruster 516 is a single fixed thruster, although multiple smaller thrusters with an identical thrust direction are used in other embodiments. Orbit phasing is maintained by periodically rotating the satellite body 502 (e.g. with reaction wheels) so that a desired thrust angle for the thruster 516 is achieved, firing the thruster 516, and then restoring the satellite body 502 to its original position after firing the thruster 516. This process can be performed during orbit maintenance windows when there is no traffic demand (e.g., when a LEO satellite 500 is over the ocean and/or another satellite in a constellation can absorb extra capacity temporarily).

Figure 6:
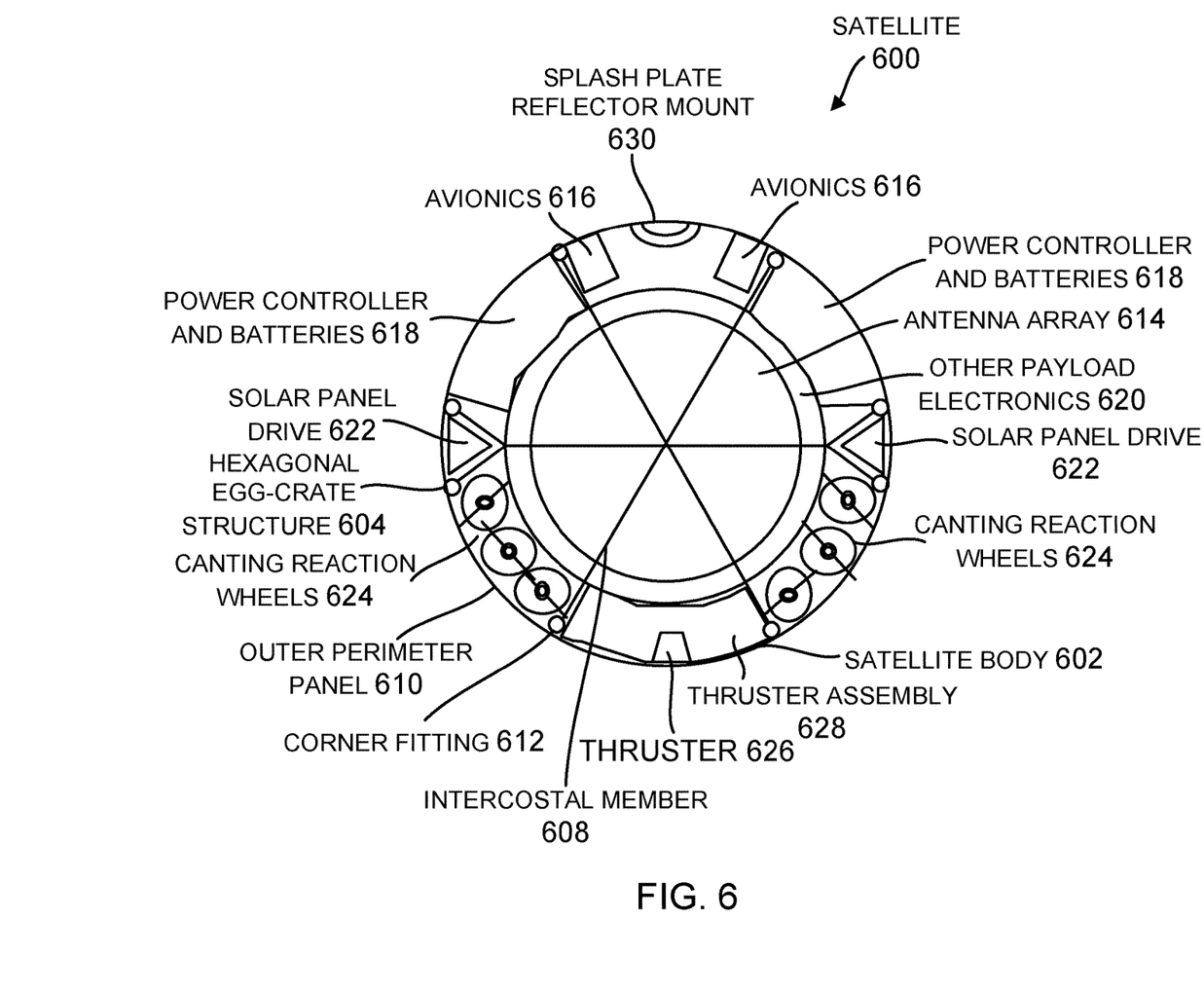
FIG. 6 illustrates a cross-section view of one embodiment of the satellite, wherein various embedded systems are located within separated sections in the satellite body.

FIG. 6 illustrates a cross-section view of one embodiment of the satellite 600, wherein the satellite body 602 has a hexagonal egg-crate structure 604, which is a load-bearing stacking structure. The body 602 includes a plurality of radially separated sections defined by a plurality of intercostal members 608, each surrounded by an outer perimeter panel 610, wherein the intercostal members 608 and adjacent outer perimeter panels 610 are joined by a plurality of elongated corner fittings 612. The various embedded systems stored in the radially separated sections include avionics 616, power controller and batteries 618, other payload electronics 620, solar panel drives 622, canting reaction wheels 624, thruster 626, thruster assembly 628 including tanks, and a splash plate reflector mount 630. When the satellite 600 is stacked, with a top satellite 600 disposed vertically on a bottom satellite 600, the plurality of elongated corner fittings 612 for the bottom satellite 600 bear the loads for both the top and bottom satellites 600. In this manner, each bottom satellite 600 includes a plurality of corner fittings 602 that bear launch loads for the bottom satellite and the at least one top satellite.

Satellite Fabrication

Figure 7:
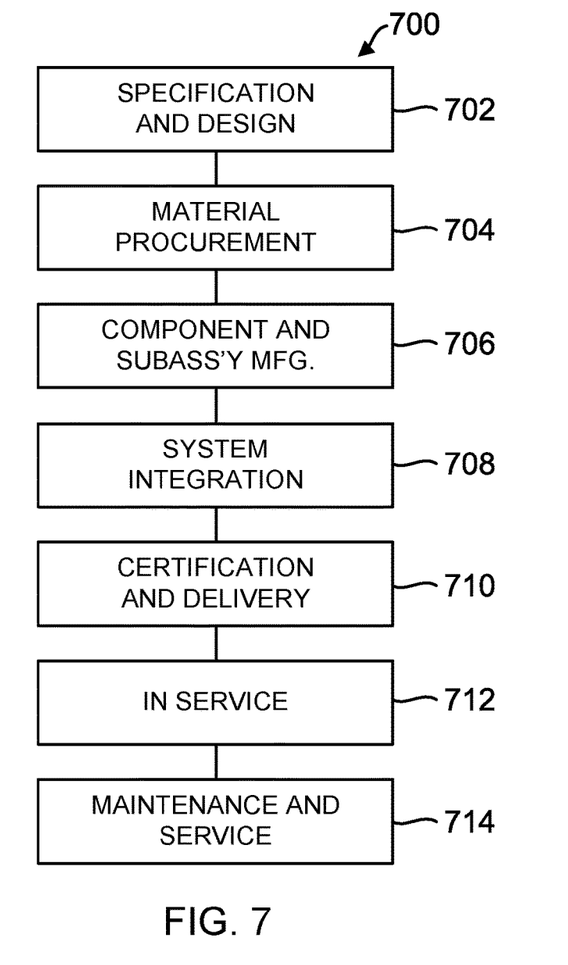
FIG. 7 is a flowchart of a satellite or spacecraft manufacturing method, according to one embodiment.
Figure 8:
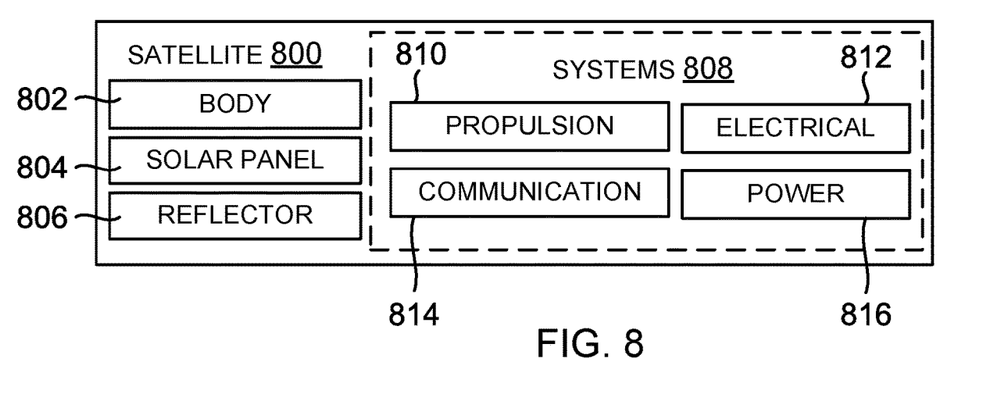
FIG. 8 is an illustration of the components of a satellite or spacecraft manufactured in FIG. 7, according to one embodiment.

Embodiments of the disclosure may be described in the context of a satellite or spacecraft fabricating method 700 as shown in FIG. 7, wherein the resulting satellite or spacecraft is shown in FIG. 8.

As illustrated in FIG. 7, during pre-production, exemplary method 700 may include specification and design 702 of the satellite 800 and material procurement 704. During production, component and subassembly manufacturing 706 and system integration 708 of the satellite 800 takes place, which include fabricating the satellite 800, body 802, solar panels 804, splash plate reflector 806, and various systems 808 described herein. Thereafter, the satellite 800 may go through certification and delivery 710 in order to be placed in service 712. The satellite 800 may also be scheduled for maintenance and service 714 (which includes modification, reconfiguration, refurbishment, and so on), before being launched.

Each of the processes of method 700 may be performed or carried out by a system integrator, a third party, and/or an operator (e.g., a customer). For the purposes of this description, a system integrator may include without limitation any number of spacecraft manufacturers and major-system subcontractors; a third party may include without limitation any number of venders, subcontractors, and suppliers; and an operator may be a satellite company, military entity, service organization, and so on.

As shown in FIG. 8, the satellite 800 fabricated by exemplary method 700 may include a body 802, solar panels 804, and splash plate reflector 806, as described in more detail above, with a plurality of systems 808. Examples of such systems 808 include, but are not limited to, one or more of a propulsion system 810, an electrical system 812, a communications system 814, and a power system 816. Any number of other systems may be included.

Benefits

A number of benefits are derived from the stackable pancake satellite. Moreover, these benefits address DFMAT (Design for Manufacturing, Assembly, and Test) issues concerning the stackable pancake satellite.

For example, some of those benefits include:

The systems, sub-systems, sections, panels, units, and components are manufactured and tested in volume to reduce cost.

The thermal radiator provides a direct path to radiate waste heat to space without the need for complex and mass heavy heat pipes.

Sections or panels may be built and tested in the best respective factories on production lines:

Functional and performance testing is minimal (possibly ~1 hour per spacecraft); and Environmental and burn-in test when deemed appropriate.

Sections or panels assembled and stacked for launch:

Potentially at launch site; and

Minimal spacecraft level testing other than interconnection and mechanism validation (possibly ~1 hour per spacecraft).

Multiple satellites can be launched at one time, thereby reducing the launch costs per satellite.

A number of basic problems are solved by of the stackable pancake satellite. For example, the stackable pancake satellite packages the maximum number of spacecraft into a fairing in the simplest manner (i.e. minimizing the number of deployments, folds, thermal interfaces, eliminating the need for heat pipes, etc.) to provide the lowest cost and highest reliability.

This is especially true when the performance of the spacecraft is driven by the area of three critical elements: the area of the payload aperture, the area of the thermal radiator for waste heat dissipation, and the area of the solar panels for power generation.

While propulsion is an important issue, it is not as significant as these three critical elements. The stackable pancake satellite configuration is enabled in part by a very modest propulsion system allowing the depth (e.g. height in the stack) of the spacecraft to be small. This is mostly due to a modest acceleration requirement.

The stackable pancake satellite configuration is enhanced by the chosen configuration of small, electrically powered thrusters, but could have been realized with other thruster technologies including traditional chemical thrusters. The particular thruster technology was chosen for mass savings, using what should be a more readily produced thruster in high volume, and for ease of manufacturing at final integration.

Other configurations may not be packaged as efficiently in the fairing and/or wind up with complex deployments to achieve the desired areas; hence, the virtue of the pancake satellite configuration.

Throughout the development, optimization for low earth orbit (LEO), with altitudes from ~500 kilometers (km) to ~1500 km, was a central focus. However, the stackable pancake satellite may be inserted into all inclinations from virtually any launch site and using any launch vehicle throughout.

Alternatives

The description of the different embodiments set forth above has been presented for purposes of illustration and description, and is not intended to be exhaustive or limited to the embodiments in the form disclosed. Many modifications and variations will be apparent to those of ordinary skill in the art. It is intended that the scope of the invention be limited not by this detailed description, but rather by the claims appended hereto.

What is claimed is:

1. An apparatus, comprising:
at least one satellite having a plurality of sections that are attached to each other, wherein the plurality of sections are folded or rotated together prior to launch, and the plurality of sections are unfolded or rotated away from each other when deployed upon reaching orbit;
a first one of the plurality of sections is a satellite body that includes at least one antenna;
a second one of the plurality of sections includes at least one solar panel attached to the satellite body for converting light from the Sun to electricity; and
a third one of the plurality of sections includes at least one splash plate reflector attached to the satellite body for reflecting radio frequency signals between Earth and the at least one antenna;
when deployed, the at least one solar panel is rotated away from the satellite body to point towards the Sun, and the at least one splash plate reflector is rotated away from the satellite body to direct the radio frequency signals between the Earth and the at least one antenna.

2. The apparatus of claim 1, wherein the satellite body has a first side that acts as a thermal radiator and a second side opposite the first side that includes the at least one antenna.

3. The apparatus of claim 2, wherein the at least one solar is panel attached to the first side of the satellite body.

4. The apparatus of claim 2, wherein the at least one splash plate reflector is attached to the second side of the satellite body.

5. The apparatus of claim 2, wherein the at least one solar panel is pointed at the Sun, the at least one splash plate reflector is pointed at the Earth, and the first side of the satellite body that acts as the thermal radiator is pointed into space.

6. The apparatus of claim 2, wherein the satellite body has a cavity on the first side and a hollow region on the second side, such that, when folded together, the at least one solar panel is folded and stowed within the hollow region, the at least one antenna is disposed within the cavity, and the at least one splash plate reflector is stored adjacent to the at least one antenna in the cavity.

7. The apparatus of claim 6, further comprising:
a polygonal closeout member covers the first side of the satellite body surrounding the cavity; and
the first side of the satellite body that acts as the thermal radiator and the at least one solar panel are disposed within the hollow region, and the at least one solar panel comprises a plurality of foldable solar arrays that, when folded, are enclosed within the hollow region.

8. The apparatus of claim 6, wherein the at least one solar panel includes a plurality of panel elements having substantially the same shape, and the plurality of panel elements are each folded upon each other to fit within the hollow region.

9. The apparatus of claim 2, wherein the first one of the plurality of sections includes bus and payload units mounted on or with the first side of the satellite body that acts as the thermal radiator.

10. The apparatus of claim 1, wherein the at least one solar panel comprises two or more solar panels.

11. The apparatus of claim 1, wherein the at least one solar panel comprises a multi-segmented array that is configured to be at least partially folded onto itself.

12. The apparatus of claim 1, wherein the at least one antenna comprises a multi-beam antenna.

13. The apparatus of claim 1, wherein at least one thruster is attached to the satellite body to maintain orbit phasing.

14. The apparatus of claim 1, wherein a periphery outline of the plurality of sections, when folded together, is oval, elliptical, round or polygonal in shape.

15. The apparatus of claim 1, wherein the plurality of sections, when folded together, maintain a substantially flat profile.

16. The apparatus of claim 1, wherein the at least one satellite comprises a plurality of satellites configured for being stacked within a payload fairing of a launch vehicle.

17. The apparatus of claim 16, wherein the plurality of satellites are disposed within the payload fairing of the launch vehicle in a stacked column configuration prior to launch.

18. The apparatus of claim 16, wherein the plurality of satellites comprises at least one top satellite disposed vertically on top of at least one bottom satellite within the payload fairing of the launch vehicle, and each bottom satellite includes a plurality of corner fittings that bear launch loads for the bottom satellite and the at least one top satellite.

19. The apparatus of claim 16, wherein the plurality of satellites are passively dispensed from the payload fairing of the launch vehicle upon reaching orbit.

20. A method, comprising:
fabricating at least one satellite having a plurality of sections that are attached to each other, wherein the plurality of sections are folded or rotated together prior to launch, and the plurality of sections are unfolded or rotated away from each other when deployed upon reaching orbit;
a first one of the plurality of sections is a satellite body that includes at least one antenna;
a second one of the plurality of sections includes at least one solar panel attached to the satellite body for converting light from the Sun to electricity; and
a third one of the plurality of sections includes at least one splash plate reflector attached to the satellite body for reflecting radio frequency signals between Earth and the at least one antenna;
when deployed, the at least one solar panel is rotated away from the satellite body, so that the at least one solar panel is pointed towards the Sun, and the at least one splash plate reflector is rotated away from the satellite body to direct the radio frequency signals between the Earth and the at least one antenna.

21. A method, comprising:
stacking at least one satellite within a payload fairing of a launch vehicle, wherein:
the at least one satellite having a plurality of sections that are attached to each other, wherein the plurality of sections are folded or rotated together prior to launch, and the plurality of sections are unfolded or rotated away from each other when deployed upon reaching orbit;
a first one of the plurality of sections is a satellite body that includes at least one antenna;
a second one of the plurality of sections includes at least one solar panel attached to the satellite body for converting light from the Sun to electricity; and
a third one of the plurality of sections includes at least one splash plate reflector attached to the satellite body for reflecting radio frequency signals between Earth and the at least one antenna;
launching the at least one satellite into orbit using the launch vehicle; and
dispensing the at least one satellite from the payload fairing of the launch vehicle upon reaching orbit, such that, when the at least one satellite is deployed, the second one of the plurality of sections is rotated away from the first one of the plurality of sections so that the at least one solar panel is pointed towards the Sun, and the third one of the plurality of sections is rotated away from the first one of the plurality of sections so that the at least one splash plate reflector directs the radio frequency signals between Earth and the at least one antenna.

22. The method of claim 21, wherein the at least one satellite comprises a plurality of satellites configured for being stacked within the payload fairing of the launch vehicle.

23. The method of claim 22, wherein the plurality of satellites are disposed within the payload fairing of the launch vehicle in a stacked column configuration prior to launch.

24. The method of claim 22, wherein the plurality of satellites comprises at least one top satellite disposed vertically on top of at least one bottom satellite within the payload fairing of the launch vehicle, and each bottom satellite includes a plurality of corner fittings that bear launch loads for the bottom satellite and the at least one top satellite.

25. The method of claim 22, wherein the plurality of satellites are passively dispensed from the payload fairing of the launch vehicle upon reaching orbit.

* * * * *